United States Patent [19]

Malkin et al.

[11] 4,369,385

[45] Jan. 18, 1983

[54] SINGLE-PHASE STEP MICROMOTOR

[76] Inventors: Daniel D. Malkin, ulitsa Junykh Lenintsev, 95/13, korpus 1, 31 kv.; Anatoly S. Umerenkov, Volokolamsky proezd, 6, korpus 1, kv. 9; Alexandr A. Ketsaris, ulitsa Krasny Kazanets 19, korpus 1, kv. 83; Gennady A. Kruglov, ulitsa Baltiiskaya, 4, kv. 21; Vladimir I. Kalashnikov, ulitsa Chasovaya, 4, korpus 2, kv. 149, all of Moscow, U.S.S.R.

[21] Appl. No.: 244,659

[22] Filed: Mar. 17, 1981

[51] Int. Cl.³ .................................................. H02K 37/00
[52] U.S. Cl. .............................. 310/49 R; 310/40 MM; 310/156; 368/160
[58] Field of Search ............. 310/49 R, 40 MM, 156, 310/162, 163, 164, 217, 218, 216; 368/157, 160, 155, 76

[56] References Cited

U.S. PATENT DOCUMENTS

| | | | |
|---|---|---|---|
| 3,671,787 | 6/1972 | Herron | 310/218 |
| 3,878,414 | 4/1975 | Harakawa | 310/162 |
| 3,949,251 | 4/1976 | Takatsuki | 310/49 R |
| 3,984,972 | 10/1976 | Yoshino | 310/40 MM |
| 3,989,967 | 11/1976 | Kikuyama | 310/49 R |
| 4,141,210 | 2/1979 | Flaig | 310/49 R |
| 4,205,244 | 5/1980 | Fukushima | 310/162 |
| 4,270,066 | 5/1981 | Terade | 310/218 |
| 4,277,704 | 7/1981 | Giger | 368/76 |

FOREIGN PATENT DOCUMENTS

| | | | |
|---|---|---|---|
| 2509883 | 11/1975 | Fed. Rep. of Germany | 310/162 |
| 2427742 | 12/1975 | Fed. Rep. of Germany | 310/49 R |
| 2528159 | 1/1976 | Fed. Rep. of Germany | 310/49 R |
| 52-46414 | 4/1977 | Japan | 310/49 R |

Primary Examiner—R. Skudy
Attorney, Agent, or Firm—Lilling & Greenspan

[57] ABSTRACT

A single-phase step micromoter comprising a stator wherein cylindrical surfaces of a pair of pole pieces face each other. Interposed between said pole pieces is a double-pole rotor. Arranged between the stator and rotor is a rotor fixing means in the form of a ring, the thickness of which is less than that of said pole pieces, and the inner diameter of the ring varies along the angular coordinate of the stator.

2 Claims, 2 Drawing Figures

SINGLE-PHASE STEP MICROMOTOR

FIELD OF THE INVENTION

The present invention relates to electrical engineering and, more particularly, to single-phase micromotors converting electric current pulses into discrete rotation of the rotor.

The invention can be applied to advantage in horology, such as for the manufacture of electronic/mechanical wrist-watches with dial display.

DESCRIPTION OF THE PRIOR ART

The growth in the production of electronic/mechanical watches characterized by high precision and convenience raised the problem of providing a step micromotor design of high efficiency and adaptability for mass production.

One step micromotor is known comprising a stator having two magnetically saturable sections with an opening, a double-pole rotor positioned in the opening and magnetized diametrically, and a means for fixing the rotor in a preset angular position relative to the stator (cf. Patent of Germany, Federal Republic of, No. 2,509,883; Cl. H 02 K 37/00, published 1975).

The rotor fixing means is made integral with the stator and fashioned as symmetrically profiled portions of the above opening.

The stator of the micromotor of this construction comprises narrow magnetically saturable sections which are difficult to manufacture in mass production because the width of the profiled portions is substantially less than the thickness of the stator plate accommodating them; for example, their width must be below 0.3 mm at the stator plate thickness of 0.5 mm, which complicates the manufacture thereof by stamping.

A disadvantage of the above step micromotor consturction therefore resides in difficulties encountered during production.

Also known is a single-phase step micromotor comprising a stator having cylindrical surfaces of a pair of pole pieces facing each other, a double-pole rotor interposed between the pole pieces, and a rotor fixing means (cf. U.S. Pat. No. 4,066,947; Cl 318-696, published 1978).

The rotor fixing means is made integral with the stator and fashioned as symmetrical semispherical indentations in the pole pieces orientated in a predetermined manner relative to the plane of symmetry of a gap formed between the pole pieces. With the diameter of the rotor being in the order of 1.5 mm and the thickness of the stator amounting to 0.5 mm, the radius of the indentations equals a mere 0.1-0.2 mm. The provision of such indentations dictates either the use of multistage production techniques or employment of needle punches having a short service life.

Thus, the heretofore described construction is also disadvantageous owing to low technological efficiency in mass production.

SUMMARY OF THE INVENTION

It is an object of the present invention to provide a structurally improved single-phase micromotor to thereby increase production efficiency during mass manufacture thereof.

The object is attained by a single-phase step micromotor comprising a stator having cylindrical surfaces of a pair of pole pieces facing each other, a double-pole rotor interposed between the pole pieces, and a rotor fixing means. According to the invention, the rotor fixing means is in the form of a ring arranged between the rotor and stator, the thickness of the ring being essentially less than that of the pole pieces, and the inner diameter of the ring varying along the angular coordinate of the stator.

This structural arrangement of the single-phase step micromotor improves the production process employed for the manufacture of the micromotor. Further, by virtue of the rotor fixing means being embodied in a single separate piece of substantially less thickness as compared to that of the pole pieces, technologically no difficulties are encountered in providing the inner contour of the ring piece and therefore can be effected by a more advanced process, such as by stamping.

Also, mating the outer surface of the ring with the inner surface of the pole pieces makes it possible to simplify the adjustment of the angular position of the rotor fixing means.

BRIEF DESCRIPTION OF THE DRAWINGS

The invention will now be described in greater detail and exemplified by a specific embodiment thereof taken in conjunction with the accompanying drawings, in which.

DETAILED DESCRIPTION OF THE INVENTION

Figure 1:
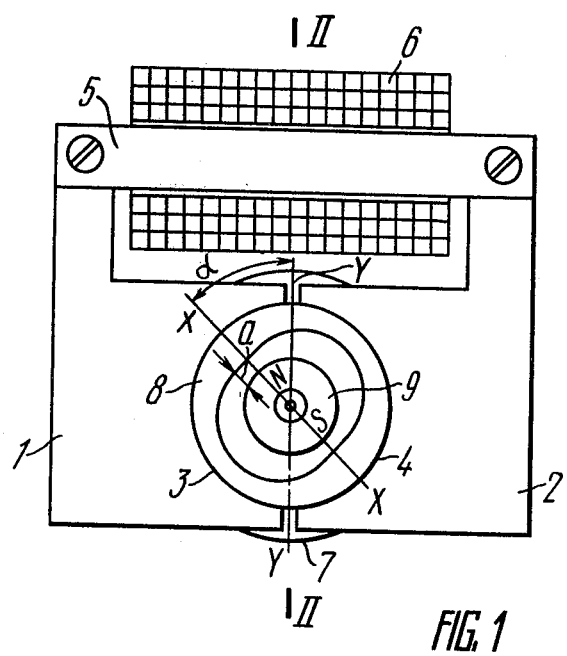
FIG. 1 is a longitudinal sectional view of a single-phase step micromotor according to the invention.
Figure 2:
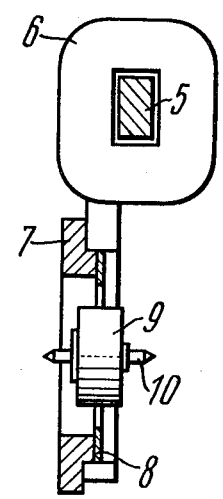
FIG. 2 is a cross sectional view taken along the line II—II of FIG. 1.

With reference to FIG. 1, there is shown a single-phase step micromotor comprising a stator with pole pieces 1 and 2 fabricated from a magnetically soft material. Surfaces 3 and 4 are adapted to face each other and to generally form a cylinder. Opposite ends of the pole pieces 1 and 2 are interconnected by a core 5 (FIGS. 1 and 2) of a magnetically soft material on which is mounted a single-phase winding 6 wired to a source of electrical pulses of varying polarity (not shown).

Affixed to one of the side surfaces 3 or 4 (FIG. 1) of the pole pieces 1 or 2, such as by spot welding, by a flange portion thereof is a sleeve element 7 (FIGS. 1 and 2) of a non-ferrous material; an end face thereof having attached or glued thereto a ferromagnetic ring 8 intended for fixing the rotor in certain angular positions relative to the pole pieces 1 and 2.

The ferromagnetic ring 8 has a thickness that is an order of magnitude less than that of the pole pieces 1 and 2. The outer surface of the ring 8 is shaped to essentially conform to the inner cylindrical surface of the pole pieces 1 and 2 (FIG. 1), and the inner surface of the ring 8 is configured to define, with the side surface of a cylindrical magnet 9 of the rotor centered in relation to the pole pieces 1 and 2, a variable gap "a". As best seen in FIG. 1, the inner surface of the ring 8 is fashioned as an oval orientated such that a lesser axis X—X thereof defines with a plane Y—Y of symmetry of the gap "a" between the pole pieces 1 and 2 an angle α ranging between 15° and 75°.

Depending on specific conditions, the inner surface of the ring 8 may be configured otherwise than shown in FIG. 1, the common requirement being that the angular displacement of the symmetrical points wherein the gap "a" is minimal relative to the plane Y—Y of symmetry would amount to form 15° to 75°.

The single phase step micromotor according to the invention operates as follows.

Upon the supply of an electric current pulse to the winding 6 (FIG. 1), a magnetic flux induced in the pole pieces 1 and 2 cooperates with the magnetic flux of the permanent magnet 9 of the rotor. A torque then appears which causes the rotor to turn and assume a position enabling a maximum magnetic flux to pass through the permanent magnet 9 thereof.

In the absence of current in the winding 6, the rotor is caused to further turn in the direction of greater magnetic conductivity produced by the ring 8. As a result, the pole axis of the permanent magnet 9 is set along the axis X—X and the rotor completes a 180° turn.

Since, prior to the supply of a current pulse of the opposite polarity the rotor poles changed position, such an impulse acts to cause the rotor to turn further in the same direction.

By virtue of the rotor fixing means being embodied in the form of a separate piece, viz. the ring 8, and due to the thickness of the ring 8 being an order of magnitude less than that of the pole pieces 1 and 2, manufacturing of said ring by pressing becomes easily attainable.

In addition, mating the outer surface of the ring 8 with the cylindrical surfaces 3 and 4 of the pole pieces makes it possible to vary the angle $\alpha$ by simply turning the ring 8.

What is claimed is:

1. A single-phase step micromotor comprising:
a stator having cylindrical surfaces of a pair of pole pieces facing each other;
a core interconnecting opposite ends of said pole pieces;
a single-phase winding mounted on said core and wired to a source of electrical pulses of varying polarity;
a double-pole rotor interposed between said pole pieces of said stator; and
a ferromagnetic ring fixing the position of said rotor and arranged between said stator and rotor, the thickness of said ring being less than that of said pole pieces, the inner diameter of said ring varying along the angular coordinate of said stator.

2. A single-phase step micromotor according to claim 1, further comprising a sleeve of a non-ferrous material affixed to a side surface of one of said pole pieces; and, wherein said ring is affixed to said sleeve.

* * * * *